United States Patent
Wang et al.

(10) Patent No.: US 7,901,827 B2
(45) Date of Patent: Mar. 8, 2011

(54) FUEL CELL APPARATUS

(75) Inventors: Cheng Wang, Hsinchu (TW); Nien-Hui Hsu, Hsinchu (TW); Jin-Shu Huang, Hsinchu (TW); Ching-Po Lee, Hsinchu (TW)

(73) Assignee: Young Green Energy Co., Hsinchu County (TW)

( * ) Notice: Subject to any disclaimer, the term of this patent is extended or adjusted under 35 U.S.C. 154(b) by 287 days.

(21) Appl. No.: 11/947,788

(22) Filed: Nov. 30, 2007

(65) Prior Publication Data

US 2008/0318113 A1    Dec. 25, 2008

(30) Foreign Application Priority Data

Jun. 21, 2007    (TW) ................................ 96122285 A

(51) Int. Cl.
*H01M 8/02*    (2006.01)
(52) U.S. Cl. ...................... 429/458; 429/459; 429/456; 429/514
(58) Field of Classification Search .................. 429/34, 429/456, 458
See application file for complete search history.

(56) References Cited

U.S. PATENT DOCUMENTS

| | | | |
|---|---|---|---|
| 6,439,212 B1 * | 8/2002 | Coleman et al. | 123/568.17 |
| 2005/0147863 A1 * | 7/2005 | Hiramatsu et al. | 429/34 |
| 2007/0015015 A1 * | 1/2007 | Hoshino et al. | 429/19 |
| 2007/0099061 A1 * | 5/2007 | Na et al. | 429/38 |

* cited by examiner

*Primary Examiner*—Patrick Ryan
*Assistant Examiner*—Brent Thomas
(74) *Attorney, Agent, or Firm*—Jianq Chyun IP Office

(57) ABSTRACT

A fuel cell apparatus including a reaction unit for performing a chemical reaction, at least one fan for providing an airflow, and an airflow guiding device is provided. The airflow guiding device is connected to the fan and the reaction unit. The airflow guiding device includes an airflow rectification segment and a first airflow separation segment. The airflow rectification segment is connected to the fan and has one flow channel. The first airflow separation segment is connected to the airflow rectification segment and disposed between the airflow rectification segment and the reaction unit. A number of flow channels inside the first airflow separation segment is $N_1$, where $N_1$ is a positive integer and $N_1 > 1$.

15 Claims, 6 Drawing Sheets

FUEL CELL APPARATUS

CROSS-REFERENCE TO RELATED APPLICATION

This application claims the priority benefit of Taiwan application serial no. 96122285, filed on Jun. 21, 2007. The entirety of the above-mentioned patent application is hereby incorporated by reference herein and made a part of this specification.

BACKGROUND OF THE INVENTION

1. Field of the Invention

The present invention relates to a cell, and more particularly to a fuel cell apparatus.

2. Description of Related Art

Fuel cells, having advantages of high efficiency, low noise, and no pollution, are an energy technology following the trend of the age. Fuel cells can be divided into many types, in which proton exchange membrane fuel cells (PEMFCs) and direct methanol fuel cells (DMFCs) are the common ones. For example, a fuel cell module of a direct methanol fuel cell includes a proton exchange membrane and a cathode and an anode respectively disposed at two sides of the proton exchange membrane.

The direct methanol fuel cell uses an aqueous methanol solution as fuel, and reaction formulae of the direct methanol fuel cell are expressed as follows.

Anode: $CH_3OH+H_2O \rightarrow CO_2+6H^++6e^-$

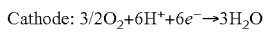
Cathode: $3/2O_2+6H^++6e^- \rightarrow 3H_2O$

Overall reaction: $CH_3OH+3/2O_2 \rightarrow CO_2+2H_2O$

It can be known from the above reaction formulae, when the direct methanol fuel cell reacts, a sufficient amount of oxygen gas ($O_2$) must be provided to the cathode.

FIG. 1 is a schematic view of a convention fuel cell apparatus. Referring to FIG. 1, a conventional fuel cell apparatus 100 includes a plurality of fuel cell modules 110, a plurality of ducts 120, and a plurality of blowers 130. Each of the blowers 130 has an outlet 132, and the ducts 120 are disposed in front of the outlets 132 of the blowers 130. Each of the ducts 120 has a splitter 122 therein to guide the airflow 50 to the two fuel cell modules 110, thus providing oxygen gas in the air to the cathodes of the fuel cell modules 110.

FIG. 2 is a schematic view of another conventional fuel cell apparatus. Referring to FIG. 2, a conventional fuel cell apparatus 100' includes a plurality of fuel cell modules 110, a plurality of ducts 120', and a plurality of blowers 130. Each of the blowers 130 has an outlet 132, and the ducts 120' are disposed in front of the outlets 132 of the blowers 130 to guide the airflow 50 provided by the blowers 130 to one fuel cell module 110, thus providing oxygen gas in the air to the cathode of the fuel cell module 110.

In the conventional fuel cell apparatuses 100, 100', as the airflow 50 provided by the blowers 130 is non-uniform, and the ducts 120, 120' are not designed for improving the non-uniformity of the airflow 50, the airflow 50 provided to the fuel cell modules 110 is non-uniform. Thus, oxygen gas cannot be uniformly provided to each position on the surface of the cathodes of the fuel cell modules 110, thus resulting in inconsistent reaction efficiencies of the fuel cell modules 110. Therefore, the reliability of the fuel cell apparatuses 100, 100' is poor. Additionally, in the prior art, a plurality of blowers 130 are used to provide the airflow 50, so more electric power is consumed, which leads to poor output powers of the fuel cell apparatuses 100, 100'. Additionally, excessive blowers 130 generate high noise and leads to extremely large volumes of the fuel cell apparatuses 100, 100'.

SUMMARY OF THE INVENTION

Accordingly, the present invention is directed to a fuel cell apparatus which has a better reliability.

As embodied and broadly described herein, an embodiment of the present invention provides a fuel cell apparatus including a reaction unit for performing a chemical reaction, at least one fan for providing an airflow, and an airflow guiding device is provided. The airflow guiding device is connected to the fan and the reaction unit. The airflow guiding device includes an airflow rectification segment and a first airflow separation segment. The airflow rectification segment is connected to the fan and has one flow channel. The first airflow separation segment is connected to the airflow rectification segment and disposed between the airflow rectification segment and the reaction unit. A number of flow channels inside the first airflow separation segment is $N_1$, where $N_1$ is a positive integer and $N_1 > 1$.

As the airflow guiding device includes an airflow rectification segment and a first airflow separation segment, the airflow provided by the fan is uniformly provided to each position of the reaction unit, such that the reaction efficiencies at each position of reaction unit are consistent. Therefore, the fuel cell apparatus of the present invention has a better reliability.

In order to the make aforementioned and other objects, features and advantages of the present invention comprehensible, preferred embodiments accompanied with figures are described in detail below.

Other objectives, features and advantages of the present invention will be further understood from the further technology features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
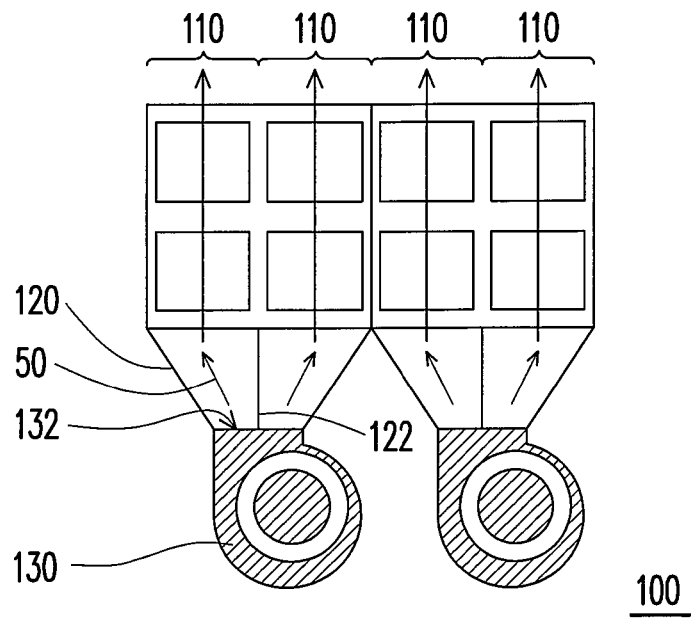
FIG. 1 is a schematic view of a convention fuel cell apparatus.
Figure 2:
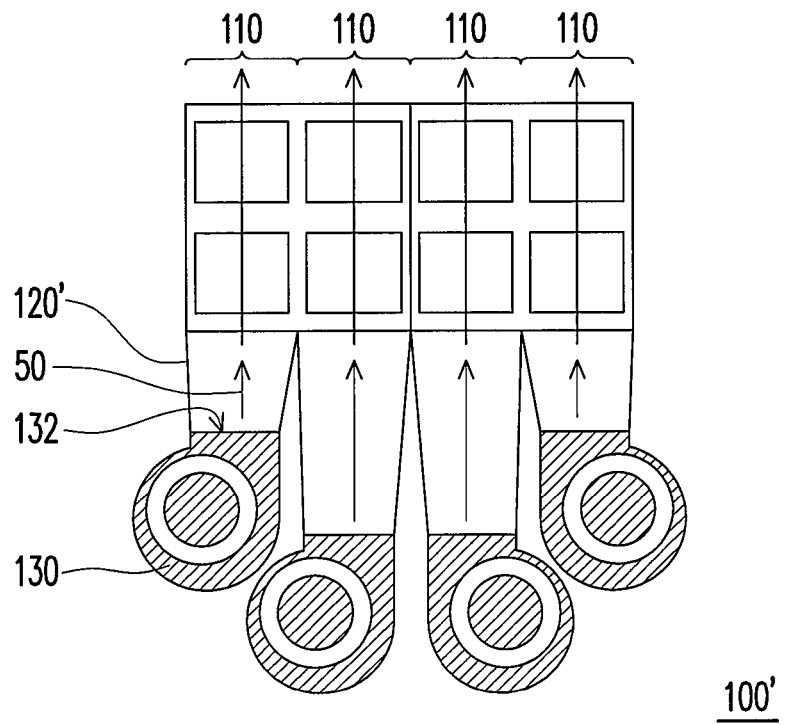
FIG. 2 is a schematic view of another conventional fuel cell apparatus.

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

FIGS. 3A to 3D are schematic views of a fuel cell apparatus according to an embodiment of the present invention. First, referring to FIG. 3A, a fuel cell apparatus 200 includes a reaction unit 210 for performing a chemical reaction, a fan 220 for providing an airflow 80, and an airflow guiding device 230. The airflow guiding device 230 is connected between the fan 220 and the reaction unit 210. The airflow guiding device 230 includes an airflow rectification segment 232 and a first airflow separation segment 234. The airflow rectification segment 232 is connected to the fan 220 and has one flow channel. The first airflow separation segment 234 is connected between the airflow rectification segment 232 and the reaction unit 210. A number of flow channels inside the first airflow separation segment 234 is $N_1$, where $N_1$ is a positive integer and $N_1>1$. In this embodiment, $N_1$ is, for example, equal to 4.

In the fuel cell apparatus 200, the reaction unit 210 includes, for example, but not limited to, four fuel cell modules 212. In other words, the number of fuel cell modules 212 may be one or more. The fuel cell modules 212 are used to perform the chemical reaction to produce electric power. Further, each of the flow channels 234a inside the first airflow separation segment 234 is, for example, corresponding to one fuel cell module 212. Additionally, the fan 220 is, for example, a blower. The fan 220 has an outlet 222, and the airflow guiding device 230 is, for example, disposed between the outlet 222 and the reaction unit 210 to guide the airflow 80 provided by the fan 220 to the reaction unit 210.

In view of the above, although a flow rate of the airflow 80 provided by the fan 220 is not uniformly distributed, and the airflow 80 may be diffused, the flow rate of the airflow 80 is uniformized, after the airflow 80 flows through the airflow rectification segment 232. Thereafter, the airflow 80 uniformly flows into all the flow channels 234a, so a flux of the airflow 80 in each of the flow channels 234a is consistent. Thus, in this embodiment, the flux and flow rate of the airflow 80 flowing to each of the fuel cell modules 212 are consistent, so the reaction efficiencies of the fuel cell modules 212 are consistent, thereby improving the reliability of the fuel cell apparatus 200. Furthermore, the fuel cell apparatus 200 of this embodiment uses one fan 220 only, so that not only the consumption of electric power is reduced to improve the output power, but also the noise and the volume are reduced.

Figure 3A:
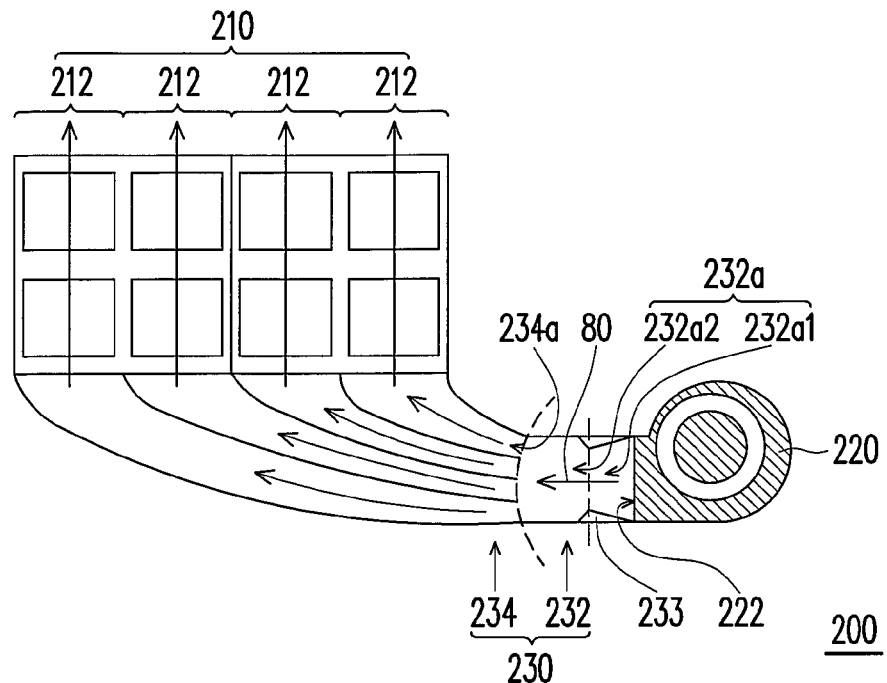
FIGS. 3A to 3D are schematic views of a fuel cell apparatus according to an embodiment of the present invention.
Figure 3B:
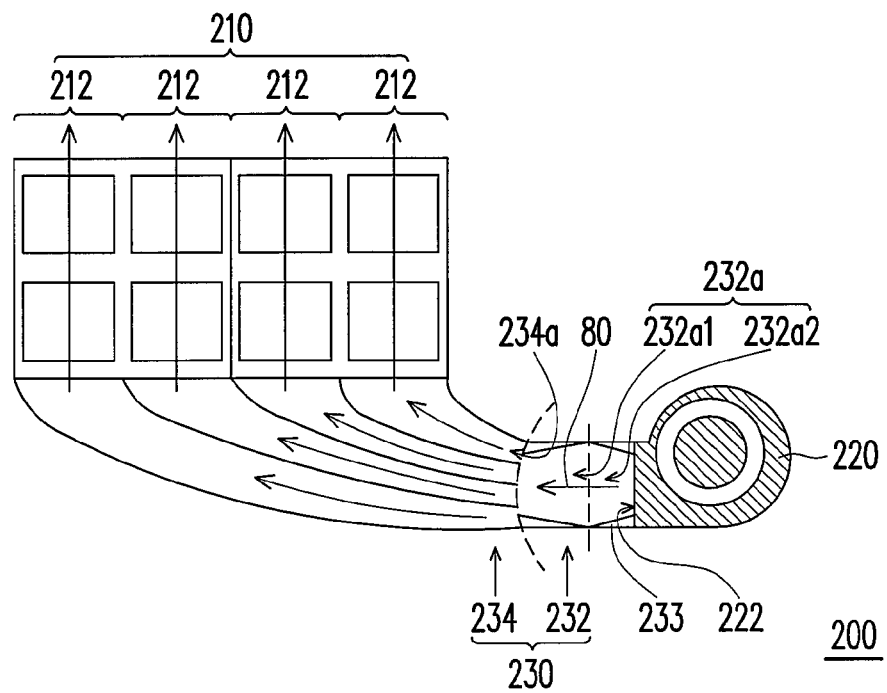
Figure 3C:
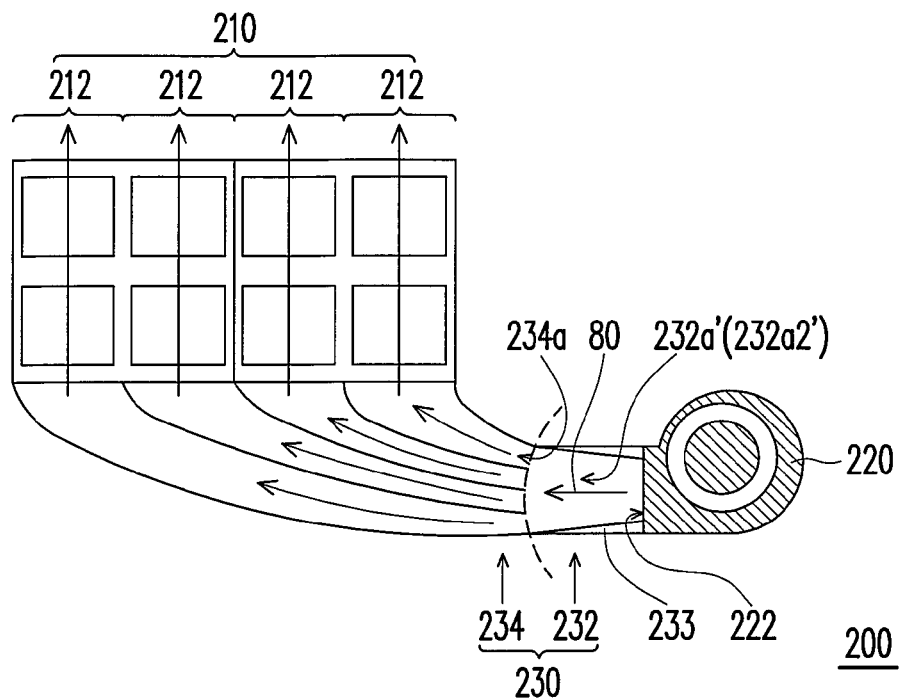
Figure 3D:
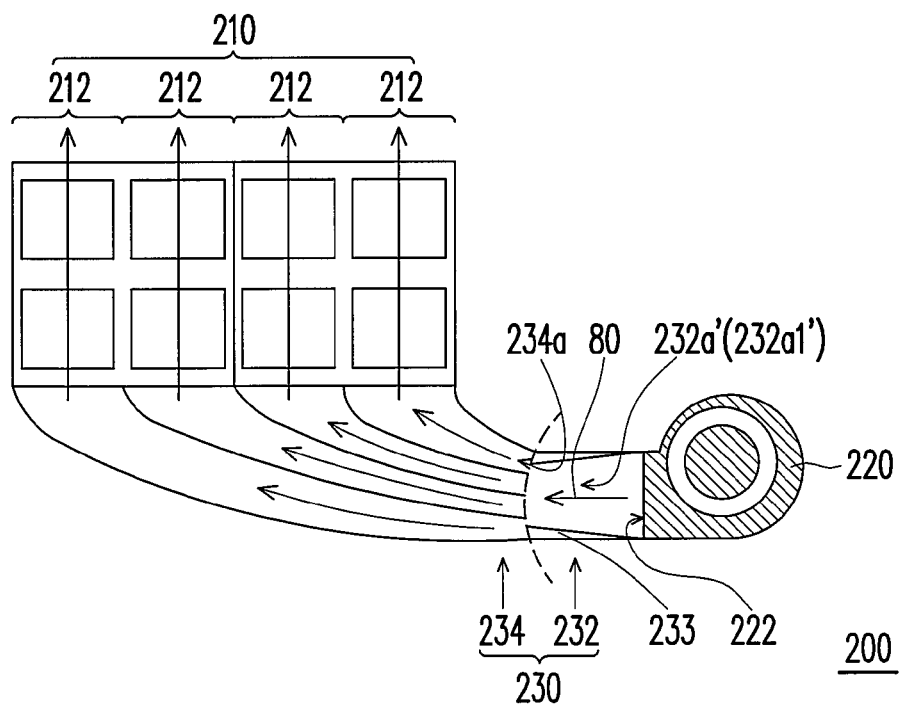

In this embodiment, in order to improve the effect that the airflow rectification segment 232 uniformizes the flow rate of the airflow 80, the flow channel 232a inside the airflow rectification segment 232 is divided into a convergent portion 232a1 and a divergent portion 232a2. In detail, in this embodiment, for example, guide blocks 233 are disposed at two sides of the flow channel 232a to divide the flow channel 232a into the convergent portion 232a1 and the divergent portion 232a2. The convergent portion 232a1 is disposed between the divergent portion 232a2 and the fan 220. The convergent portion 232a1 is gradually converged along a first direction, the divergent portion 232a2 is gradually diverged along the first direction, and the first direction is a direction from the fan 220 to the first airflow separation segment 234. Further, in order to improve the effect that the airflow rectification segment 232 uniformizes the flow rate of the airflow 80, the design of the flow channel 232a inside the airflow rectification segment 232 is not limited to this embodiment. Referring to FIGS. 3B to 3D, in FIG. 3B, a fuel cell apparatus 200' is similar to the fuel cell apparatus 200 in terms of the structure, and a main difference lies in that the divergent portion 232a2 is disposed between the convergent portion 232a1 and the fan 220. In FIG. 3C, a fuel cell apparatus 200'' is similar to the fuel cell apparatus 200 in terms of the structure, and a main difference lies in that the flow channel 232a' inside the airflow rectification segment 232 includes a divergent portion 232a2' disposed between the first airflow separation segment 234 and the fan 220, and the divergent portion 232a2' is gradually diverged along the first direction. In FIG. 3D, a fuel cell apparatus 200a is similar to the fuel cell apparatus 200 in terms of the structure, and a main difference lies in that the flow channel 232a1' inside the airflow rectification segment 232 includes a convergent portion 232a1' disposed between the first airflow separation segment 234 and the fan 220, and the convergent portion 232a1' is gradually converged along the first direction.

Figure 4:
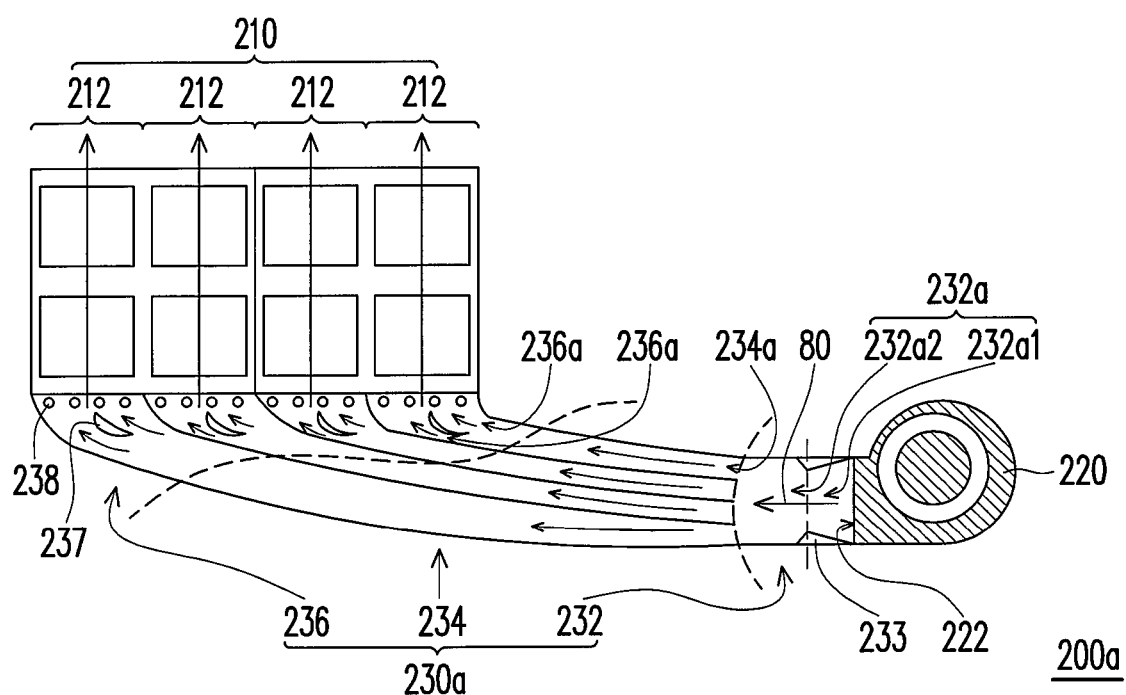
FIG. 4 is a schematic view of a fuel cell apparatus according to another embodiment of the present invention.

FIG. 4 is schematic view of a fuel cell apparatus according to another embodiment of the present invention. Referring to FIG. 4, a fuel cell apparatus 200a is similar to the fuel cell apparatus 200 in FIG. 3A, and the difference lies in that an airflow guiding device 230 of the fuel cell apparatus 200a further includes a second airflow separation segment 236. The second airflow separation segment 236 is connected between the first airflow separation segment 234 and the reaction unit 210. A number of flow channels inside the second airflow separation segment 236 is $N_2$, where $N_2$ is a positive integer and $N_2>N_1$. In this embodiment, $N_2$ is, for example, equal to $2N_1$, namely, $N_2$ is equal to 8.

In detail, a plurality of guide vanes 237 are disposed in the second airflow separation segment 236 to form $N_2$ flow channels 236a inside the second airflow separation segment 236. The shapes of the guide vanes 237 are different as required. The propose of disposing the guide vanes 237 is to make the flow rate and flux of the airflow 80 uniformly flowing to each position of each of the fuel cell modules 212, thereby further improving the consistency of the reaction efficiencies of the fuel cell modules 212 and improving the reliability of the fuel cell apparatus 200a.

Additionally, in this embodiment, those of ordinary skills in the art can deduce with reference to the present invention that the airflow guiding device 230a of the fuel cell apparatus 200a can further include a third airflow separation segment, a fourth airflow separation segment, and the like, and the details will not be explained with drawings.

Further, the airflow guiding device 230a further includes a plurality of first airflow guide elements 238 disposed inside the second airflow separation segment 236 and adjacent to the reaction unit 210. The first airflow guide elements 238 may be, but not limited to, guide blocks, guide rods, or films with irregular shapes. The disposal of the first airflow guide element 238 makes the flow rate and flux of the airflow 80 uniformly flowing to each position of each of the fuel cell modules 212. In this manner, the consistency of the reaction efficiencies of the fuel cell modules 212 is further improved, and the reliability of the fuel cell apparatus 200a is thus improved.

Figure 5:
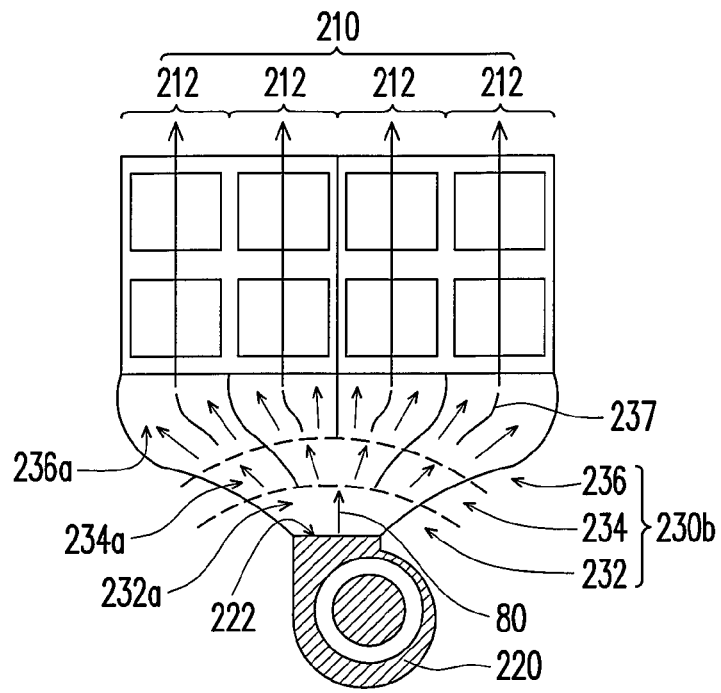
FIG. 5 is a schematic view of a fuel cell apparatus according to another embodiment of the present invention.

FIG. 5 is a schematic view of a fuel cell apparatus according to another embodiment of the present invention. Referring to FIG. 5, a fuel cell apparatus 200b of this embodiment is similar to the fuel cell apparatus 200a in FIG. 4, and the difference lies in that an outlet 222 of a fan 220 of the fuel cell apparatus 200b is corresponding to a reaction unit 210, and the shape of an airflow guiding device 230b is adjusted correspondingly. The airflow guiding device 230b also includes an airflow rectification segment 232, a first airflow separation segment 234, and a second airflow separation segment 236. The effect of the airflow guiding device 230b is similar to that of the airflow guiding device 230a of the fuel cell apparatus 200a, so the details will not be described herein again.

Figure 6:
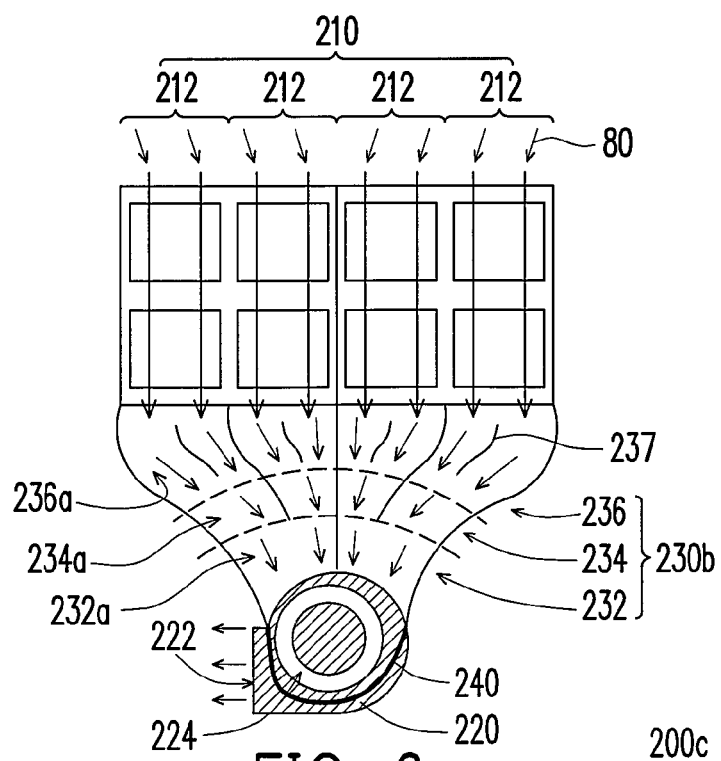
FIG. 6 is a schematic view of a fuel cell apparatus according to another embodiment of the present invention.

FIG. 6 is a schematic view of a fuel cell apparatus according to another embodiment of the present invention. Referring to FIG. 6, a fuel cell apparatus 200c is different from the fuel cell apparatus 200b in FIG. 5 in terms of the disposal manner of the fan 220. In more detail, the fan 220 of the fuel cell apparatus 200c sucks the airflow 80 to flow through a reaction unit 210, a secondary airflow separation segment 236, a primary separation segment 234, and an airflow rectification segment 232 in sequence, and then blows out the airflow 80 through an outlet 222 of the fan 220. Additionally, the fuel cell apparatus 200c further includes a sealing element 240 to make an inlet 224 of the fan 220 and each of the flow channels of the airflow guiding device 230 being in the same enclosed space.

Though the fuel cell apparatuses 200, 200a, 200b, and 200c in the above embodiments have, but not limited to, one fan 220, the number of the fan 220 is not limited in the present invention. The embodiment using a plurality of fans 220 is explained with reference to the drawing hereinafter.

Figure 7:
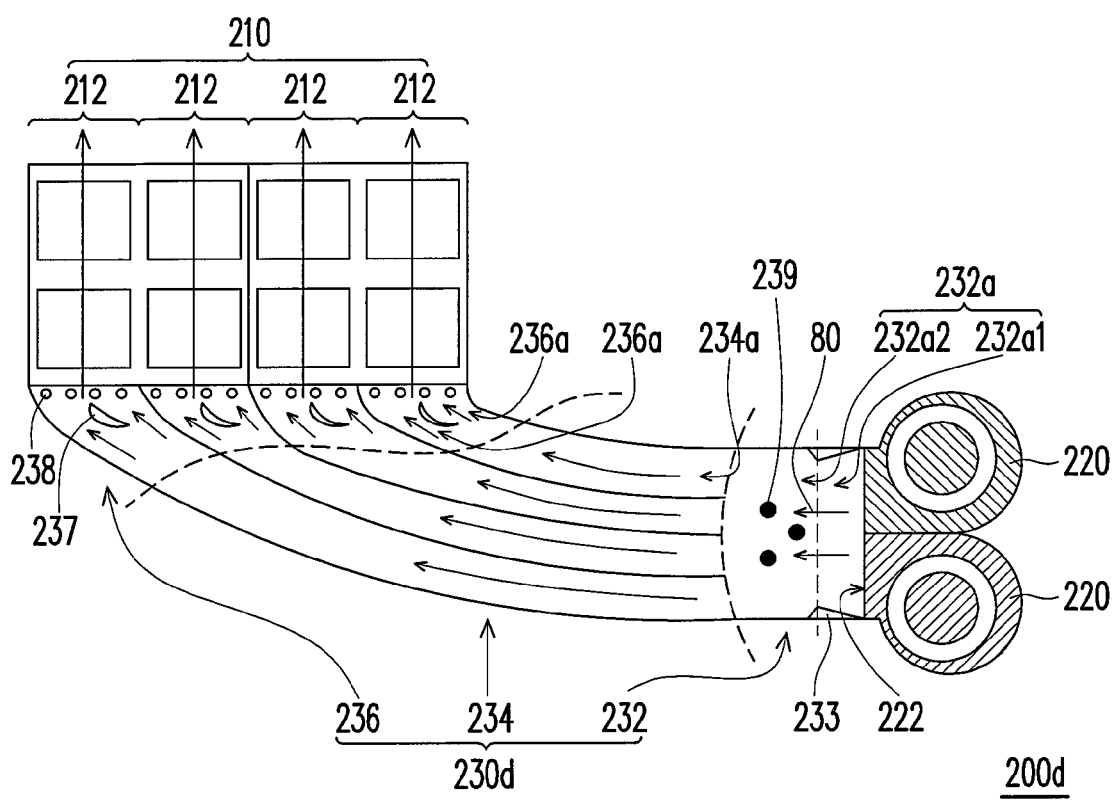
FIG. 7 is a schematic view of a fuel cell apparatus according to another embodiment of the present invention.

FIG. 7 is a schematic view of a fuel cell apparatus according to another embodiment of the present invention. Referring to FIG. 7, a fuel cell apparatus 200d has similar structure and advantages of the fuel cell apparatus 200a, so only the difference in terms of structure is explained as follows. The difference between the fuel cell apparatus 200d and the fuel cell apparatus 200a lies in that the fuel cell apparatus 200d includes two fans 220. Further, an airflow guiding device 230d of the fuel cell apparatus 200d further includes a plurality of second airflow guide elements 239 disposed inside an airflow rectification segment 232 and adjacent to the fans 220. As the flow field of the airflow 80 provided by the two fans 220 is non-uniform, the disposal of the second airflow guide element 239 quickly uniformizes the airflow 80, thus reducing the length of the airflow rectification segment 232, and further reducing the overall volume of the fuel cell apparatus 200d.

In view of the above, the fuel cell apparatus according to an embodiment of the present invention has at least one, part of, or all of the following advantages.

1. As the airflow guiding device includes an airflow rectification segment and a first airflow separation segment, the airflow provided by the fan is uniformly provided to each position of the reaction unit, such that the reaction efficiencies at each position of the reaction unit are consistent. Therefore, the fuel cell apparatus of the present invention has a better reliability.

2. The fuel cell apparatus according to an embodiment of the present invention uses one fan only, so not only the consumption of electric power is reduced to improve the output power, but also the noise and the volume are reduced.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A fuel cell apparatus, comprising:
    a reaction unit for performing a chemical reaction, wherein the reaction unit comprises a plurality of fuel cell modules;
    at least one fan for providing an airflow; and
    an airflow guiding device, connected to the fan and the reaction unit, and comprising:
        an airflow rectification segment, connected to the fan, the airflow rectification segment having one flow channel; and
        a first airflow separation segment, connected to the airflow rectification segment, and disposed between the airflow rectification segment and the reaction unit, a number of flow channels inside the first airflow separation segment being N1, where N1 is a positive integer and N1>1, wherein N1 is equal to the number of the fuel cell modules of the reaction unit, the flow channels inside the first airflow separation segment respectively communicate with the fuel cell modules of the reaction unit, the airflow is capable of passing through the rectification segment, the airflow from the rectification segment is capable of passing through the flow channels inside the first airflow separation segment and is respectively capable of entering the corresponding fuel cell modules, each of the flow channels inside the first airflow separation segment has an inlet, the airflow from the rectification segment is capable of entering the flow channels inside the first airflow separation segment respectively through the inlets, and lengths of paths of the airflow between the fan and the inlets are substantially the same.

2. The fuel cell apparatus as claimed in claim 1, wherein the airflow guiding device further comprises a second airflow separation segment connected to the first airflow separation segment and the reaction unit, and a number of flow channels inside the second airflow separation segment is N2, where N2 is a positive integer and N2>N1.

3. The fuel cell apparatus as claimed in claim 2, wherein N2=2N1.

4. The fuel cell apparatus as claimed in claim 2, wherein the airflow guiding device further comprises a plurality of first airflow guide elements disposed in the second airflow separation segment and adjacent to the reaction unit.

5. The fuel cell apparatus as claimed in claim 1, wherein the flow channel inside the airflow rectification segment comprises a convergent portion and a divergent portion, the convergent portion is disposed between the divergent portion and the fan and is gradually converged along a first direction, the divergent portion is gradually diverged along the first direction, and the first direction is a direction from the fan to the first airflow separation segment.

6. The fuel cell apparatus as claimed in claim 1, wherein the flow channel inside the airflow rectification segment comprises a divergent portion and a convergent portion, the divergent portion is disposed between the convergent portion and the fan and is gradually diverged along a first direction, the convergent portion is gradually converged along the first direction, and the first direction is a direction from the fan to the first airflow separation segment.

7. The fuel cell apparatus as claimed in claim 1, wherein the flow channel inside the airflow rectification segment comprises a divergent portion disposed between the first airflow separation segment and the fan and gradually diverged along a first direction, and the first direction is a direction from the fan to the first airflow separation segment.

8. The fuel cell apparatus as claimed in claim 1, wherein the flow channel inside the airflow rectification segment comprises a convergent portion disposed between the first airflow separation segment and the fan and gradually converged along a first direction, and the first direction is a direction from the fan to the first airflow separation segment.

9. The fuel cell apparatus as claimed in claim 1, wherein the airflow guiding device further comprises a plurality of second airflow guide elements disposed inside the airflow rectification segment and adjacent to the fan.

10. A fuel cell apparatus, comprising:
a reaction unit for performing a chemical reaction, wherein the reaction unit comprises a plurality of fuel cell modules;
at least one fan for providing an airflow; and
an airflow guiding device, connected to the fan and the reaction unit, and comprising:
an airflow rectification segment, connected to the fan, the airflow rectification segment having one flow channel;
a first airflow separation segment, connected to the airflow rectification segment, and disposed between the airflow rectification segment and the reaction unit, a number of flow channels inside the first airflow separation segment being N1, where N1 is a positive integer and N1>1, wherein N1 is equal to the number of the fuel cell modules of the reaction unit, the flow channels inside the first airflow separation segment respectively communicate with the fuel cell modules of the reaction unit, the airflow is capable of passing through the rectification segment, the airflow from the rectification segment is capable of passing through the flow channels inside the first airflow separation segment and is respectively capable of entering the corresponding fuel cell modules, each of the flow channels inside the first airflow separation segment has an inlet, the airflow from the rectification segment is capable of entering the flow channels inside the first airflow separation segment respectively through the inlets, and lengths of paths of the airflow between the fan and the inlets are substantially the same; and
a second airflow separation segment, connected to the first airflow separation segment and the reaction unit, a number of flow channels inside the second airflow separation segment being N2, where N2 is a positive integer and N2>N1, wherein the airflow from the first airflow separation segment is capable of passing through the second airflow separation segment and is capable of entering the fuel cell modules.

11. The fuel cell apparatus as claimed in claim 10, wherein the flow channel inside the airflow rectification segment comprises a convergent portion and a divergent portion, the convergent portion is disposed between the divergent portion and the fan and is gradually converged along a first direction, the divergent portion is gradually diverged along the first direction, and the first direction is a direction from the fan to the first airflow separation segment.

12. The fuel cell apparatus as claimed in claim 10, wherein the flow channel inside the airflow rectification segment comprise a divergent portion and a convergent portion, the divergent portion is disposed between the convergent portion and the fan and is gradually diverged along a first direction, the convergent portion is gradually converged along the first direction, and the first direction is a direction from the fan to the first airflow separation segment.

13. The fuel cell apparatus as claimed in claim 10, wherein the flow channel inside the airflow rectification segment comprises a divergent portion disposed between the first airflow separation segment and the fan and gradually diverged along a first direction, and the first direction is a direction from the fan to the first airflow separation segment.

14. The fuel cell apparatus as claimed in claim 10, wherein the flow channel inside the airflow rectification segment comprises a convergent portion disposed between the first airflow separation segment and the fan and gradually converged along a first direction, and the first direction is a direction from the fan to the first airflow separation segment.

15. The fuel cell apparatus as claimed in claim 10, wherein the airflow guiding device further comprises a plurality of second airflow guide elements disposed inside the airflow rectification segment and adjacent to the fan.

* * * * *